United States Patent [19]

Lux

[11] 4,310,414
[45] Jan. 12, 1982

[54] LIQUID SEPARATOR

[76] Inventor: O. Wade Lux, 90 Ridgeway Ave., Santa Rosa, Calif. 95406

[21] Appl. No.: 248,513

[22] Filed: Mar. 27, 1981

[51] Int. Cl.³ .............................................. B01D 33/04
[52] U.S. Cl. ................................... 210/238; 210/393; 210/400; 210/406; 474/128
[58] Field of Search ............... 210/783, 393, 396, 397, 210/400, 401, 406, 407, 408, 411, 412, 232, 238; 474/101, 119, 121, 122, 128

[56] References Cited

U.S. PATENT DOCUMENTS

| | | | |
|---|---|---|---|
| 2,960,233 | 11/1960 | Schepman | 210/401 |
| 3,049,236 | 8/1962 | De Lara | 210/400 |
| 3,307,704 | 3/1967 | Pashaian | 210/400 |
| 3,506,128 | 4/1970 | Pashaian | 210/400 |
| 4,142,971 | 3/1979 | LeFur | 210/783 |
| 4,172,035 | 10/1979 | Adams | 210/400 |

Primary Examiner—Ernest G. Therkorn
Attorney, Agent, or Firm—Melvin R. Stidham

[57] ABSTRACT

A portable machine for separating liquid from a slurry comprising an interconnected pair of beams cantilevered above the base with a plurality of rollers rotatably mounted between them. An endless belt is carried on and driven by the rollers to move upward from a slurry hopper, over a source of liquid-drawing vacuum, and back down under the hopper and collector tank. The belt and rollers are scraped and washed on the return run and, because of the cantilevered configuration, the belt is easily removed by sliding it off the rolls from one side of the machine.

8 Claims, 9 Drawing Figures

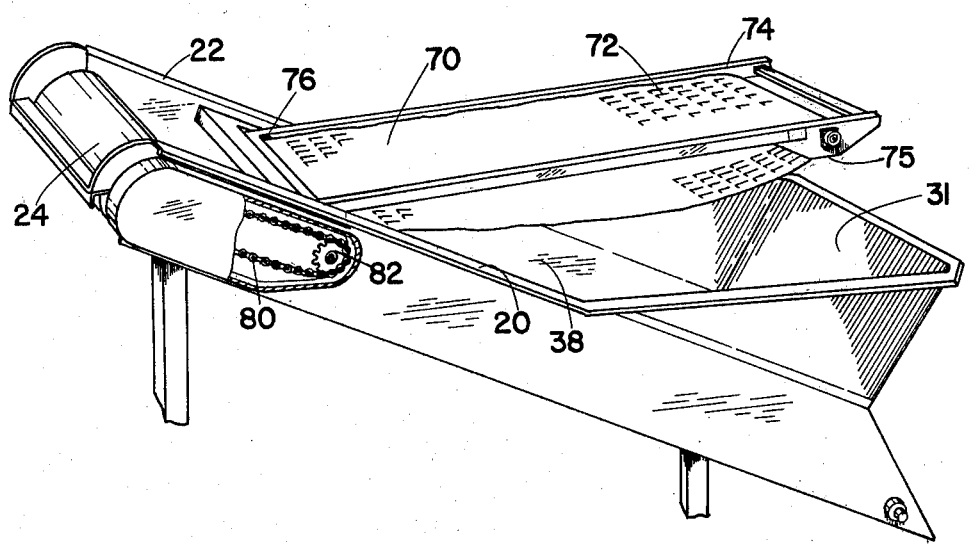
Fig. 5
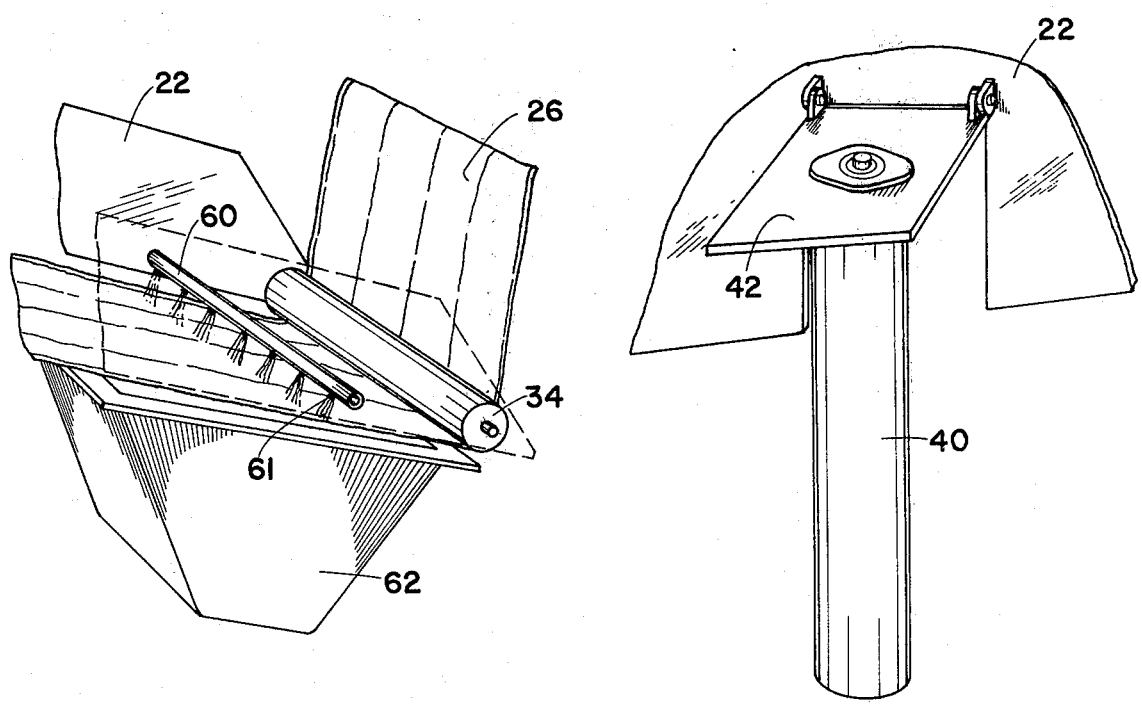
Fig. 4
Fig. 3

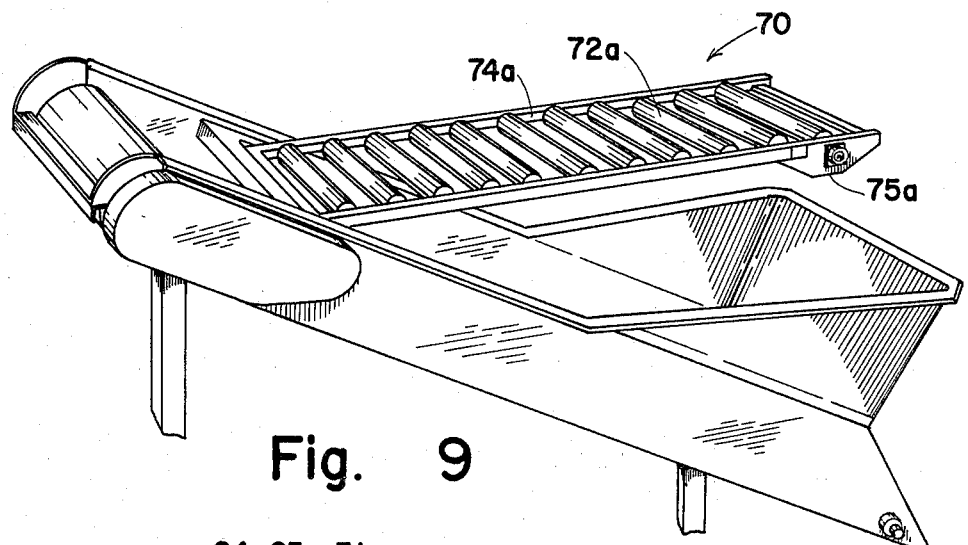
Fig. 9
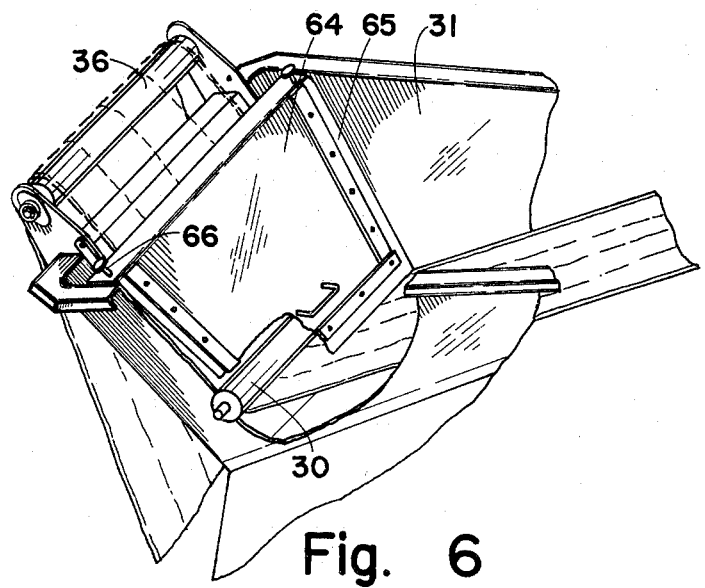
Fig. 6
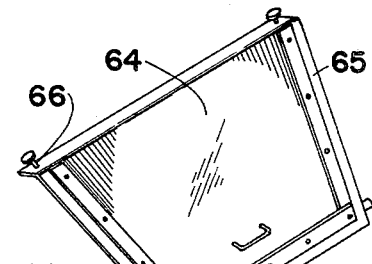
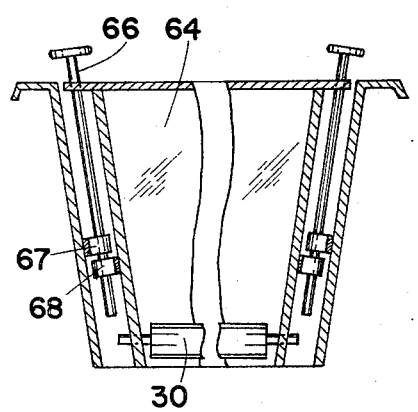
Fig. 8
Fig. 7

LIQUID SEPARATOR

BACKGROUND OF THE INVENTION

This invention relates to a machine for separating liquid from a sludge or slurry, utilizing a vacuum to draw the liquid through a porous belt and into a collecting tank. Such machines have generally been effective but when the slurry being separated is intended for human consumption, such as a crushed fruit slurry from which juice is being extracted, there is a particular need to facilitate regular and relatively frequent machine cleanup.

OBJECTS OF THE INVENTION

It is an object of this invention to provide a portable machine for removing liquid from a slurry.

It is a further object of this invention to provide a machine for separating liquid from a slurry wherein endless, self-cleaning, porous belts of various mesh sizes, through which the liquid is drawn may be easily removed for changing to meet process needs.

It is a further object of this invention to provide a machine for removing a liquid from a slurry wherein all parts of the machine coming in contact with the liquid or the slurry are accessible for cleaning.

It is a further object of this invention to provide an endless porous belt machine utilizing both a pressure drop and force of gravity to separate the liquid from the slurry.

Other objects and advantages of this invention will become apparent from the description following, particularly when read in conjunction with the accompanying drawing.

SUMMARY OF THE INVENTION

In carrying out this invention, I provide a driven endless belt of a porous material, such as a plastic or fabric mesh through which liquid is drawn into a collecting tank disposed below the upper, working run of the belt. The working run of the belt is uphill so that, as the slurry moves away, liquid tends to separate by flowing back under gravity. In addition, there is a source of vacuum opening into the upper portions of the tank to draw liquid through the working run of the belt. The belt is carried on driven and idler rollers which are rotated between a pair of parallel beams, one of which is supported on legs from a lower base. A tensioning roll is pivoted on one beam and releasably attached to the other beam so that when it is pivoted down, it releases tension on the belt sufficiently to enable the belt to be removed laterally over the cantilever beam structure for cleaning. An under-support frame carrying a moving link belt or a series of rollers is pivoted over the collecting tank to underlie the porous belt, so that when the latter is removed, it can be pivoted upward to provide full access to the collector tank for cleaning.

BRIEF DESCRIPTION OF THE DRAWINGS

In the drawings:

FIG. 3 is a view in perspective of the other tension roller bearing mounting;

FIG. 4 is a partial view in perspective of a portion of the machine with belt washing device;

FIG. 5 is a view in perspective of the machine with belt removed and belt support system raised for cleaning;

FIG. 6 is a partial view in perspective showing the descending run of the porous belt entering the slurry tank and shield therefor;

FIG. 7 is a view in perspective with shield and bottom roller removed;

FIG. 8 is a vertical section view showing the shield mounting; and

FIG. 9 is a view in perspective of another form of belt support.

DESCRIPTION OF A PREFERRED EMBODIMENT

Figure 1:
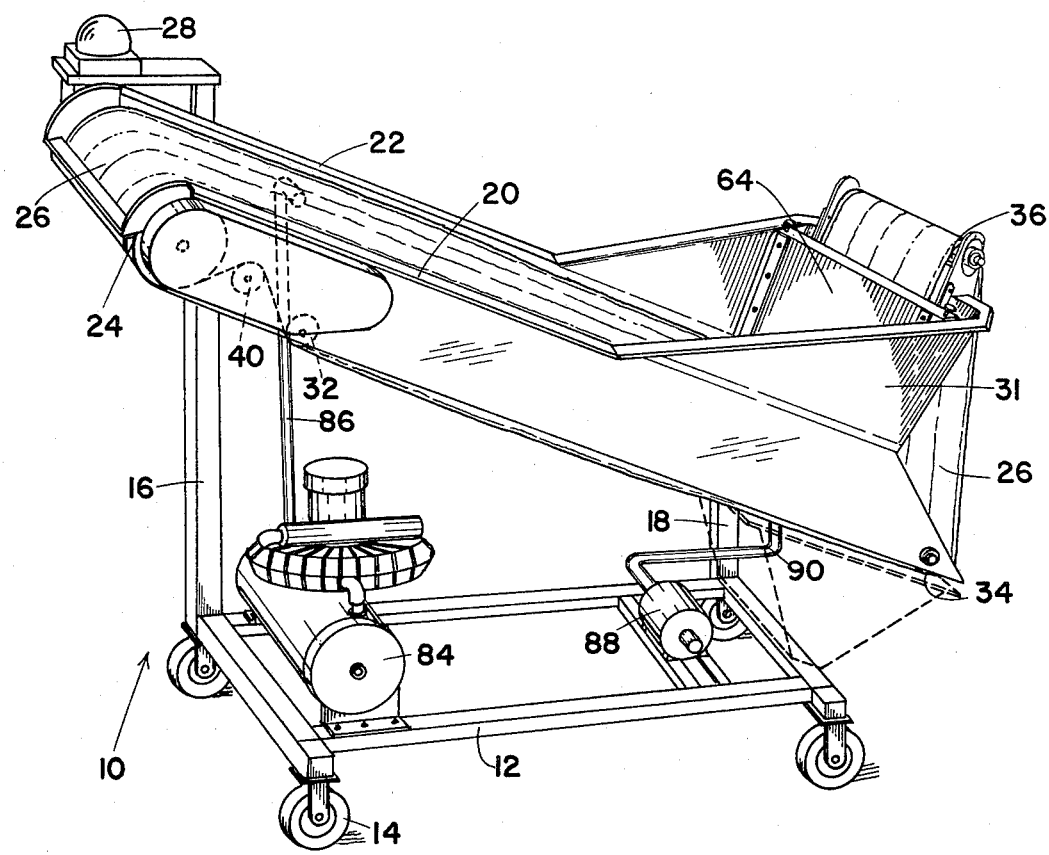
FIG. 1 is a view in perspective, partially broken away, of the slurry separating machine of this invention.

Referring to the drawings with greater particularity, the slurry or sludge separating machine 10 of this invention includes a generally rectangular base 12 of steel channels, box beams or the like, supported on wheels 14. A pair of legs 16 and 18 carried on one side only of the base 12 support a pair of generally parallel, interconnected beams 20 and 22.

A drive roll 24 which is driven through any suitable means from a motor 28 drives a porous belt 26 of a suitable material such as a mesh of plastic or fabric filaments through which water may be drawn to separate it from sludge or slurry carried on the belt 26. A series of idler rolls 30 (FIGS. 6 and 8) 32, 34 and 36 carry the belt 26, first on an upgrade, work run from a wet end at bottom roller 30, within a hopper 31 where the slurry or sludge is introduced, and then around the drive roller 24 and back on the return run over rolls 32 and 34. Finally, in a transition run, the belt is taken up over roll 36 and down and back into the hopper 31 and under the bottom roll 30 at the start of the working run.

On the upgrade working run, liquid in the slurry is drawn through the belt 26 into a collector tank 38 (FIG. 5) by a vacuum and by force of gravity as it flows down the belt, which is moving on the upgrade. Extending across the beams 20 and 22 on the under or return run of the belt is a snubbing or belt tensioning roller 40 which is disposed between the driven roller 24 and the first idler roll 32 on the return run so that it diverts the belt from a straight path to tension it.

Figure 2:
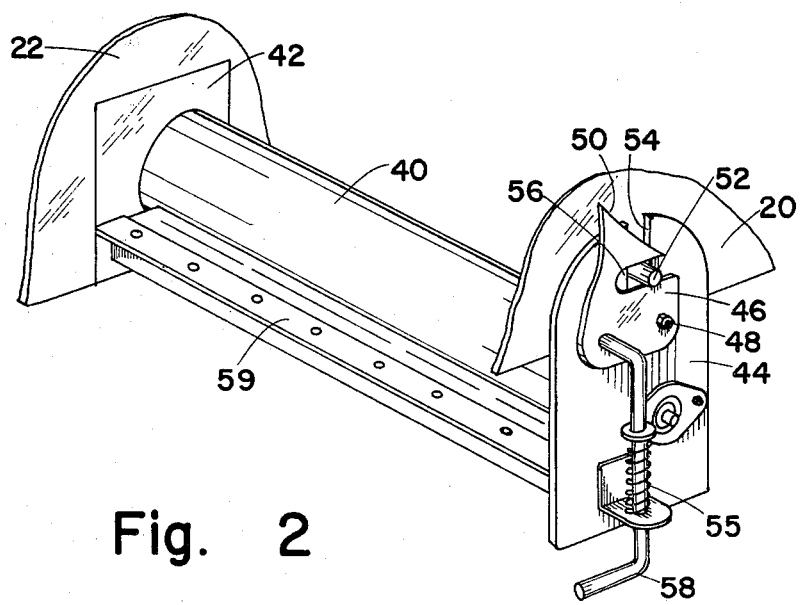
FIG. 2 is a partial view in perspective of one bearing mounting of a belt tensioning roller.

The belt tensioning roller 40 is rotatably mounted in brackets 42 and 44 (FIG. 2). The bracket 42 is pivoted to the beam 22 (FIG. 3), and the bracket 44 carries a latch 46 which is pivoted thereon at 48. The top of latch 46 has a cam surface 50 which engages a pin 52 extending laterally from the beam 20. Hence, when the roll 40 is lifted toward horizontal position, the pin 52 is received in a vertical slot 54 in the bracket 44 and then engages the cam surface 50 to pivot the latch 46 back against a spring 55 until it engages in a horizontal slot 56 in the latch. There, the pin is confined by the intersecting horizontal and vertical slots 54 and 56 to lock the latch 44 in place.

In order to lower the roll 44 to release tension on the belt 26 the latch 46 is pivoted counter-clockwise by pulling a handle 58 secured thereto, against the spring 55. Then, with the horizontal slot 56 moves free of the pin 52, the bracket 44 is free to move downward to release the tensioning roll 40. A scraper blade 59 is carried between the brackets 42 and 44 to engage the surface of the belt 26 for removal of solids which may be transferred from the belt during operation.

Near the end of the return run of the belt 26 a belt cleaning pipe 60 (FIG. 4) is supported by the beam 22 and a series of nozzles 61, which open therefrom, jet water over the inner surface of the belt 26, so that additional solid particles clinging to the belt 26 may be washed away and into a waste tank 62 below. Hence, the porous belt 26 is continuously scraped and washed during operation.

Referring now to FIGS. 6, 7 and 8, the bottom, or wet end roller 30 in the hopper 31 is protected by a shield 64 which is mounted in the hopper 31 and has, around its side and bottom edges a gasket seal 65 of rubber or the like. The shield 64 rotatably carries the bottom roller 34 so that shield 64 and roller 30 may be installed and removed as a unit. In place, a pair of rods 66 on the shield engage lugs 67 on the hopper 31, as well as complementary lugs 68 on the shield 64 to lock the latter in place.

With the shield 64 and bottom roll 30 removed, and with the snub roll pivoted down to the position shown in FIG. 3, the belt 26 is readily removable over the cantilevered beam 20 and rolls 24, 32, 34 and 36 for cleaning and/or replacement. The replacement belt is simply draped over the same cantilivered rolls; the shield and bottom roll 30 are placed as described to engage the outer surface of the belt; and the snub roll 40 is pivoted up to the position shown in FIG. 2 to further tension against the outside of the belt.

Referring now to FIG. 5, the undersupport member may take the form of a link chain of relatively rigid, linked perforated slats 72, mounted in a rectangular frame 74. The frame 74 is pivotably mounted between the beams 20 and 22 about the axis of the upper drive roller 76. The frame 74 normally rests on the bottom of the collector tank on feet 75 but with the porous belt 26 removed, the frame 74 may be pivoted upward to provide full access for cleaning the hopper 31 and collector tank 38. Further, the support belt 70 may be operated while so raised so it may be sprayed or scrubbed while in motion.

The support belt is driven by suitable means, such as chain and sprocket 80 and 82 from the driven roll 24 so that the support belt 70 moves at the same velocity as the porous belt and supports it against the pressure differential caused by the vacuum to which it is exposed, as will be described, to minimize friction drag.

Referring now to FIG. 9 the frame 74a of the undersupport 70a may simply have a plurality of rollers 72a to support the porous belt, particularly at pressure differentials which are not too great. As in FIG. 5, the frame 74a may be pivoted upward about its upper end to facilitate cleaning.

Provided on the base 12 is a source of vacuum 84 which is connnected by a suitable conduit 86 to the upper portion of the collector tank 38 to draw liquid from the slurry on the porous belt 26 traversing above it. Liquid recovered in the collector tank is pumped at 88 through a conduit 90 at the bottom of the collector tank for disposition.

While this invention has been described in conjunction with a preferred embodiment thereof, it is obvious that modifications and changes therein may be made by those skilled in the art without departing from the spirit and scope of the invention, as defined by the claims appended hereto.

What is claimed as invention is:

1. A machine for removing liquid from a slurry comprising:

a base;
a pair of spaced, generally parallel, interconnected beams;
at least one vertical support member secured between said base and just one of said beams for cantilever support of said pair of beams;
a drive roll and a plurality of idler rolls rotatably mounted between said beams;
an endless porous belt carried on, to be driven by, said rolls on a working run from a wet end to a dry end, and down and back on a return run back to said wet end;
a liquid collector tank supported between said beams and disposed between said working and return runs;
a vacuum conduit connected between upper portions of said tank and a source of vacuum;
a liquid drain from the lower portions of said tank; and
a belt tensioning roller journaled in brackets on said beams between a pair of said rolls;
one of said brackets being pivoted to one of said beams and the other of said brackets being releasably attached to the other of said beams;
said belt tensioning roller being conditioned to release tension on said belt enough to enable removal of same over said beams when said other bracket is released from said other beam.

2. The machine defined by claim 1 including:
a support belt within said tank to traverse the length thereof;
said support belt comprising a plurality of relatively rigid, perforated narrow panels linked together along their long edges and being driven at the velocity of said porous belt to support same against forces of pressure differential produced by said source of vacuum.

3. The machine defined by claim 2 including:
rotary drive means carrying said support belt at the upper end thereof;
said support belt being pivotable about the axis of said drive means to facilitate cleaning thereof;

4. The machine defined by claim 1 including:
a slurry hopper supported by said beams at said wet end, there being idler rolls rotatably mounted between said side rails and across said hopper to support a transition run of said porous belt from the end of the return run, up and over the end of said hopper and down to said wet end.

5. The machine defined by claim 1 wherein:
said wet end is at a lower level than said dry end, and said working run is on an upgrade so that separation of water from said slurry is facilitated by moving in the opposite direction under force of gravity.

6. The machine defined by claim 1 including:
scraper blades supported between said beams to engage said porous belt at at least some of said rolls in the initial stage of said return run.

7. The machine defined by claim 1 including:
a belt washer duct supported by said one beam and extending transversely across and above the return run of said belt downstream of said tank;
a plurality of ports along said washer duct to jet water on the inner surface of said porous belt; and
a reservoir disposed below said porous belt in the area of said belt washer duct.

8. The machine defined by claim 1 wherein:

said belt tensioning roller is along said return run and is at a level above said pair of rolls so that when said roller is pivoted down tension on said porous belt is released; and including:
a pin on said other beam;
a latch pivotable on said other bracket;
a generally horizontal slot in said latch to receive said pin; and
an upper cam surface on said latch engagable with said pin to pivot said latch aside when said roller is raised toward horizontal disposition.

* * * * *